(12) United States Patent
Witzens et al.

(10) Patent No.: US 7,916,377 B2
(45) Date of Patent: Mar. 29, 2011

(54) INTEGRATED CONTROL SYSTEM FOR LASER AND MACH-ZEHNDER INTERFEROMETER

(75) Inventors: Jeremy Witzens, Seattle, WA (US); Behnam Analui, Alhambra, CA (US); Sina Mirsaidi, San Diego, CA (US); Thiruvikraman Sadagopan, Mountain View, CA (US); Brian Welch, San Diego, CA (US); Adithyaram Narasimha, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 12/611,584

(22) Filed: Nov. 3, 2009

(65) Prior Publication Data
US 2010/0128336 A1 May 27, 2010

Related U.S. Application Data

(60) Provisional application No. 61/198,079, filed on Nov. 3, 2008.

(51) Int. Cl.
*G02B 26/00* (2006.01)
*G02B 26/08* (2006.01)
*G02B 6/10* (2006.01)
(52) U.S. Cl. .................. 359/239; 359/302; 385/129
(58) Field of Classification Search .......... 359/237–239, 359/315, 215, 247, 251–252, 254, 108, 278–279, 359/290–292, 298, 300–302; 385/1–3, 40, 129–132, 5, 8–9
See application file for complete search history.

(56) References Cited

U.S. PATENT DOCUMENTS
5,951,627 A * 9/1999 Kiamilev et al. ............. 708/404
2008/0180340 A1 * 7/2008 Hobbs et al. ................. 343/785
* cited by examiner

*Primary Examiner* — Scott J Sugarman
*Assistant Examiner* — Dawayne A Pinkney
(74) *Attorney, Agent, or Firm* — McAndrews, Held & Malloy, Ltd.

(57) ABSTRACT

An integrated control system for a laser and Mach-Zehnder interferometer are disclosed and may include configuring a bias point for low-speed control of an optical modulator utilizing control circuitry integrated on the same CMOS die. The optical modulator may be differentially monitored. A laser source for the modulator may be controlled utilizing monitor photodiodes via optical taps on outputs of the modulator, or utilizing a monitor photodiode on one output port of the modulator, which may comprise a Mach-Zehnder interferometer. An error signal may be generated by subtracting monitor photodiode signals from optical taps on output ports of the modulator. The bias point of the modulator may be adjusted by minimizing the error signal. Calibration time of the bias point may be reduced utilizing electronic data inversion. An output of the modulator may comprise a Y-junction and a single monitor photodiode may measure both branches of the modulator.

20 Claims, 7 Drawing Sheets

INTEGRATED CONTROL SYSTEM FOR LASER AND MACH-ZEHNDER INTERFEROMETER

CROSS-REFERENCE TO RELATED APPLICATIONS/INCORPORATION BY REFERENCE

This application makes reference to and claims priority to U.S. Provisional Application Ser. No. 61/198,079 filed on Nov. 3, 2008, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to signal processing. More specifically, certain embodiments of the invention relate to an integrated control system for a laser and Mach-Zehnder interferometer.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for integrated control system for a laser and Mach-Zehnder interferometer, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for an integrated control system for a laser and Mach-Zehnder interferometer. Exemplary aspects of the invention may comprise configuring a bias point for low-speed control of an optical modulator utilizing control circuitry integrated on the same CMOS die as the optical modulator. Optical signals of the optical modulator may be differentially monitored. A laser source for the optical modulator may be controlled utilizing one or more monitor photodiodes via optical taps on output ports of the optical modulator. A laser source for the optical modulator may be controlled utilizing a monitor photodiode on an output port of the optical modulator. The optical modulator may comprise a Mach-Zehnder interferometer. An error signal may be generated by subtracting monitor photodiode signals from optical taps on two output ports of the optical modulator. The bias point of the optical modulator may be adjusted by minimizing the error signal. Calibration range of the bias point may be reduced utilizing electronic data inversion. An output of the optical modulator may comprise a Y-junction and a single monitor photodiode may measure both branches of the optical modulator.

Figure 1A:
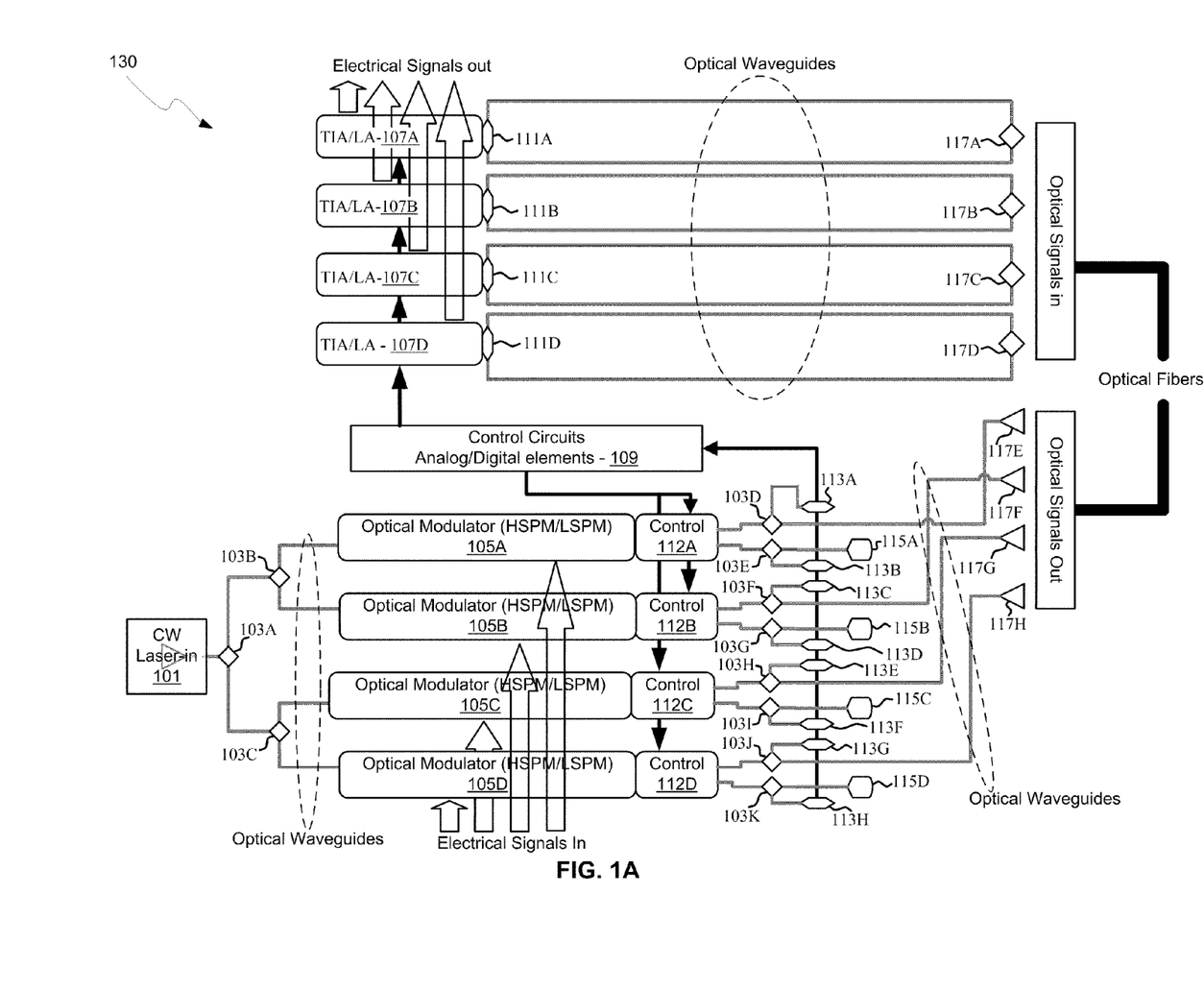
FIG. 1A is a block diagram of a photonically enabled CMOS chip, in accordance with an embodiment of the invention.

FIG. 1A is a block diagram of a photonically enabled CMOS chip, in accordance with an embodiment of the invention. Referring to FIG. 1A, there is shown optoelectronic devices on a CMOS chip 130 comprising optical modulators 105A-105D, high-speed photodiodes 111A-111D, monitor photodiodes 113A-113H, and optical devices comprising taps 103A-103K, optical terminations 115A-115D, and grating couplers 117A-117H. There is also shown electrical devices and circuits comprising transimpedance and limiting amplifiers (TIA/LAs) 107A-107E, analog and digital control circuits 109, and control sections 112A-112D. Optical signals are communicated between optical and optoelectronic devices via optical waveguides fabricated in the CMOS chip 130.

The optical modulators 105A-105D comprise Mach-Zehnder or ring modulators, for example, and enable the modulation of the CW laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

This mismatch between the waveguides may be intentional, such as in an imbalanced MZI, but is often unintentional in a nominally balanced MZI due to small imperfections in waveguide fabrication. The phase modulators then have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junctions (PINPM) where current injection into the PIN junction modifies the carrier density, and thus the index of refraction of the semiconductor material. An example of HSPM is a reversed biased PIN junction, where the index of refraction is also modulated via the carrier density, but which allows much faster operation, albeit at a lower phase modulation efficiency per waveguide length.

The outputs of the modulators are optically coupled via waveguides to the grating couplers 117E-117H. The taps 103D-103K comprise four-port optical couplers, for example, and are utilized to sample the optical signals generated by the optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D are utilized to couple light received from optical fibers into the CMOS chip 130, and the grating couplers 117E-117H are utilized to couple light from the CMOS chip 130 into optical fibers. The optical fibers may be epoxied, for example, to the CMOS chip, and may be aligned at an angle from normal to the surface of the CMOS chip 130 to optimize coupling efficiency.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D then communicate electrical signals off the CMOS chip 130.

The control sections 112A-112D comprise electronic circuitry that enable modulation of the CW laser signal received from the splitters 103A-103C. The optical modulators 105A-105D require high-speed electrical signals to modulate the refractive index in respective branches of a Mach-Zehnder interferometer (MZI), for example.

In operation, a Mach-Zehnder interferometer splits light into two optical paths. After applying phase modulation to one or both of the optical paths, the light from both paths may be recombined. The resulting intensity at the output port of the device is a function of the phase modulation that was applied to the optical paths.

The choice of phase tuning device may enable reduction of the active phase tuning required to compensate for passive biasing. Different types of phase tuning devices have different types of penalties. For example, TPMs typically have high power consumption per induced phase and forward biased PIN junctions may have high optical losses per applied phase. Similarly, reverse biased PIN junctions require a long device length per maximum achievable phase range, and thus also generate static insertion losses that scale with the maximum achievable phase range. Therefore, the benefits of reducing active phase tuning requirements depend on the choice of phase tuning device.

The intensity at the output port of the MZI is proportional to $1+\sin(\phi_{Tune}+\phi_{Mod}+\phi_{Passive}+\phi_0)$, where $\phi_{Tune}$ is the tuning phase applied by the phase modulator(s), which comprises the phase required to compensate for passive biasing, $\phi_{Mod}$ is the data modulation phase applied by the phase modulator(s), or the phase applied according to an electric data stream, $\phi_{Passive}$ is the passive biasing of the MZI due to random device mismatch and environmental conditions, and $\phi_0$ is the passive biasing of the MZI due to systematic device properties. For example, replacing a Y-junction by a directional coupler would modify $\phi_0$ by ±90 degrees depending on the phase convention. For optimum MZI operation, the phase tuning maximizes the slope of this transfer function as a function of $\phi_{Mod}$ and corresponds to $\phi_{Tune}+\phi_{Passive}+\phi_0=0$ modulo $2\pi$, or $\phi_{Tune}+\phi_{Passive}+\phi_0=\pi$ modulo $2\pi$. In the latter case the optical data is inverted relative to the former case. These phase tuning conditions may be considered 3 dB points, since the average output power, taken over data modulation, corresponds to ½ the maximum output power over all possible phase tuning conditions.

The passive biasing of the MZI is subject to environmental changes. For example, a change in absolute temperature, or in temperature gradients across the MZI, typically impacts the passive phase of the MZI. Temperature changes can be induced by changes outside the system, such as ambient temperature, or changes within the system, such as electronic power dissipation that leads to self heating of the chip. The temperature or temperature gradients can directly have an impact on the index of refraction of the waveguides, via the thermal properties of the constituting materials, or indirectly. For example, temperature effects can create stress fields in the chip that then modify the index of refraction of the waveguide via the opto-mechanical properties of the constituting materials. In this case, the control system should continuously adjust the tuning of the MZI for environmental changes, via a closed loop feedback system.

A Tx subsystem based on one or several MZIs modulating the light intensity according to an electrical data stream also requires one or more light sources. For example, a laser diode can provide light for one or several channels via the CW laser In 101. In this case the light from the diode may be split into several channels with devices such as Y-junctions and/or directional couplers. The light intensity provided by the laser diode may also need to be controlled in a datacom/telecom system. This requirement may be due to dynamic range limitations of the receiver (Rx) whose sensitivity might degrade both at low and high optical powers, or to minimize power consumption and/or maximize the lifetime of the laser. The laser should then be controlled at a power as low as possible while maintaining the link.

In an embodiment of the invention, an integrated control system may be operable to control an MZI, as well as, optionally, a laser. In instances were the laser may be shared between several channels, the laser power may be controlled based on data collected from one, several or all of these channels.

Figure 1B:
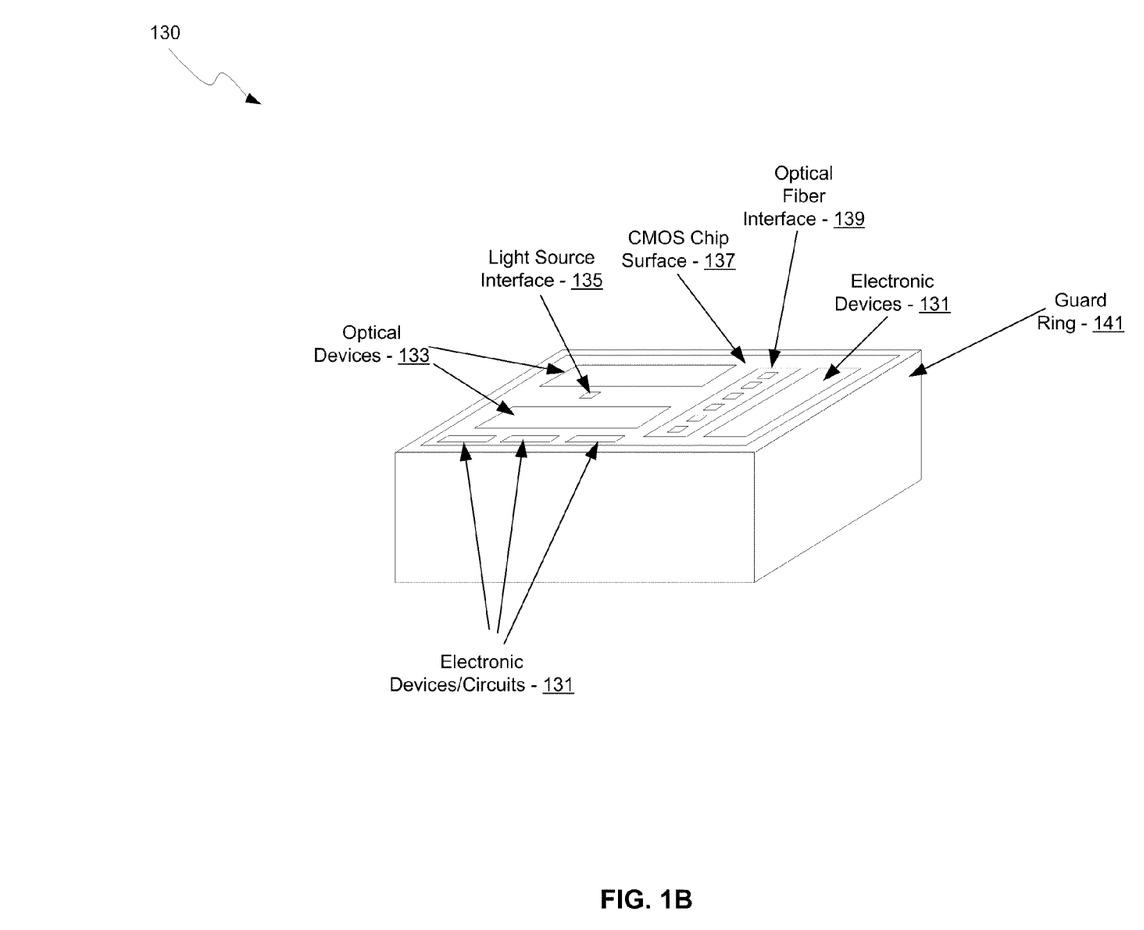
FIG. 1B is a diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip surface 137, an optical fiber interface 139, and CMOS guard ring 141.

The light source interface 135 and the optical fiber interface 139 comprise grating couplers that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the TIA/LAs 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, optical modulators 105A-105D, high-speed photodiodes 111A-111D, and monitor photodiodes 113A-113H.

Figure 1C:
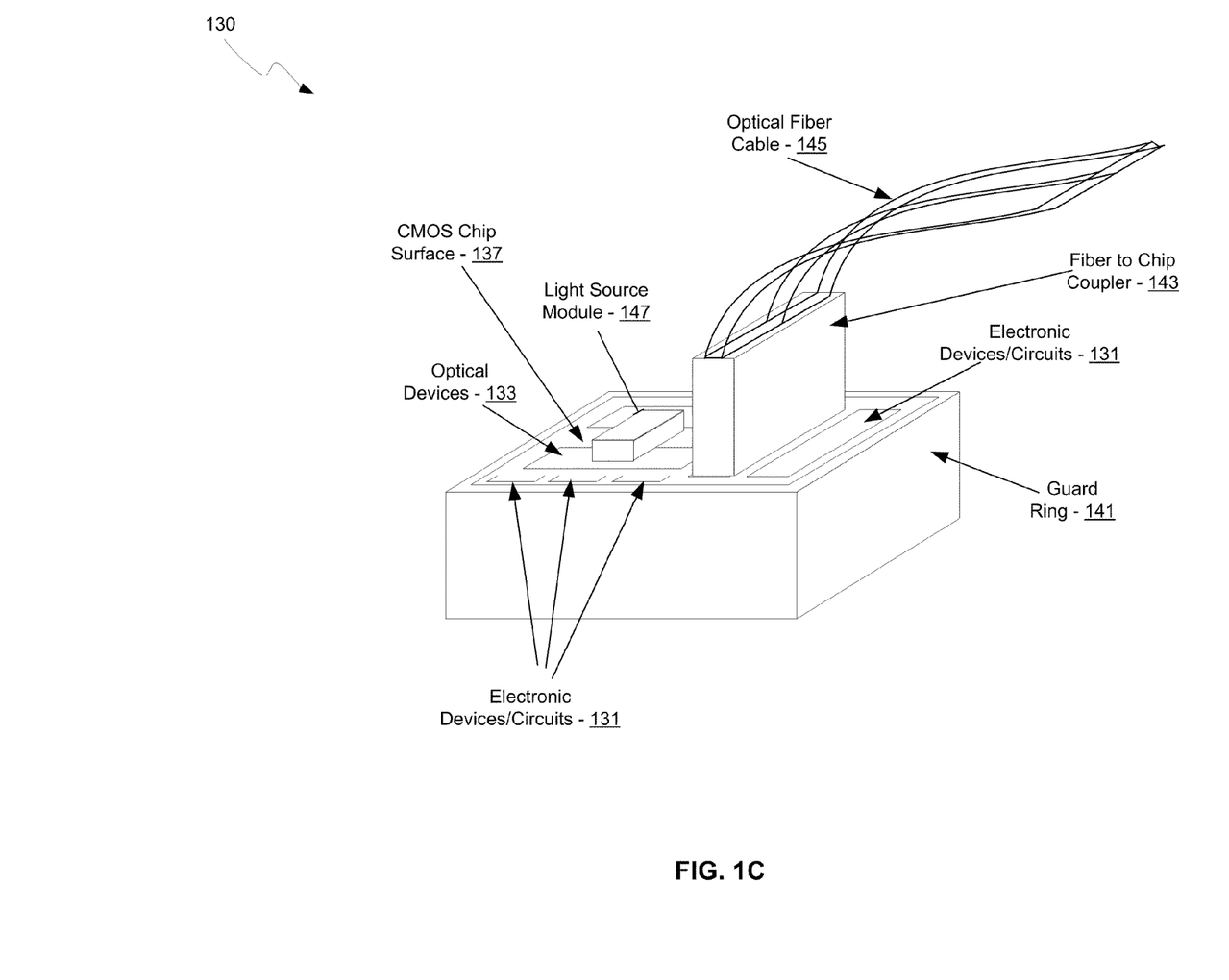
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the electronic devices/circuits 131, the optical and optoelectronic devices 133, the light source interface 135, the CMOS chip surface 137, and the CMOS guard ring 141. There is also shown a fiber to chip coupler 143, an optical fiber cable 145, and a light source module 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

The light source module 147 may be affixed, via epoxy or solder, for example, to the CMOS chip surface 137. In this manner a high power light source may be integrated with optoelectronic and electronic functionalities of one or more high-speed optoelectronic transceivers on a single CMOS chip.

A distributed Mach-Zehnder interferometer (MZI) comprises a number of unit drivers each receiving an electrical signal and amplifying it to drive a separate optical modulating element in one of the MZI arms. The modulating elements may use the electrical signal from the unit drivers to create a phase shift in the optical carrier. Such a phase shift may be directly additive as light travels from one modulating element to the next, and may accumulate along each of the interferometer arms, allowing the MZI to achieve a significant phase difference between the optical signals in the two arms. When the light is recombined, the resulting constructive and destructive interference patterns may create a two-level amplitude envelope which follows the applied electrical signal.

In an embodiment of the invention, the distributed MZI may be integrated on a single chip, such as the CMOS chip 130. The substrate may comprise silicon, or other semiconductor material such as germanium, indium phosphide, gallium arsenide, or indium gallium arsenide.

Figure 2:
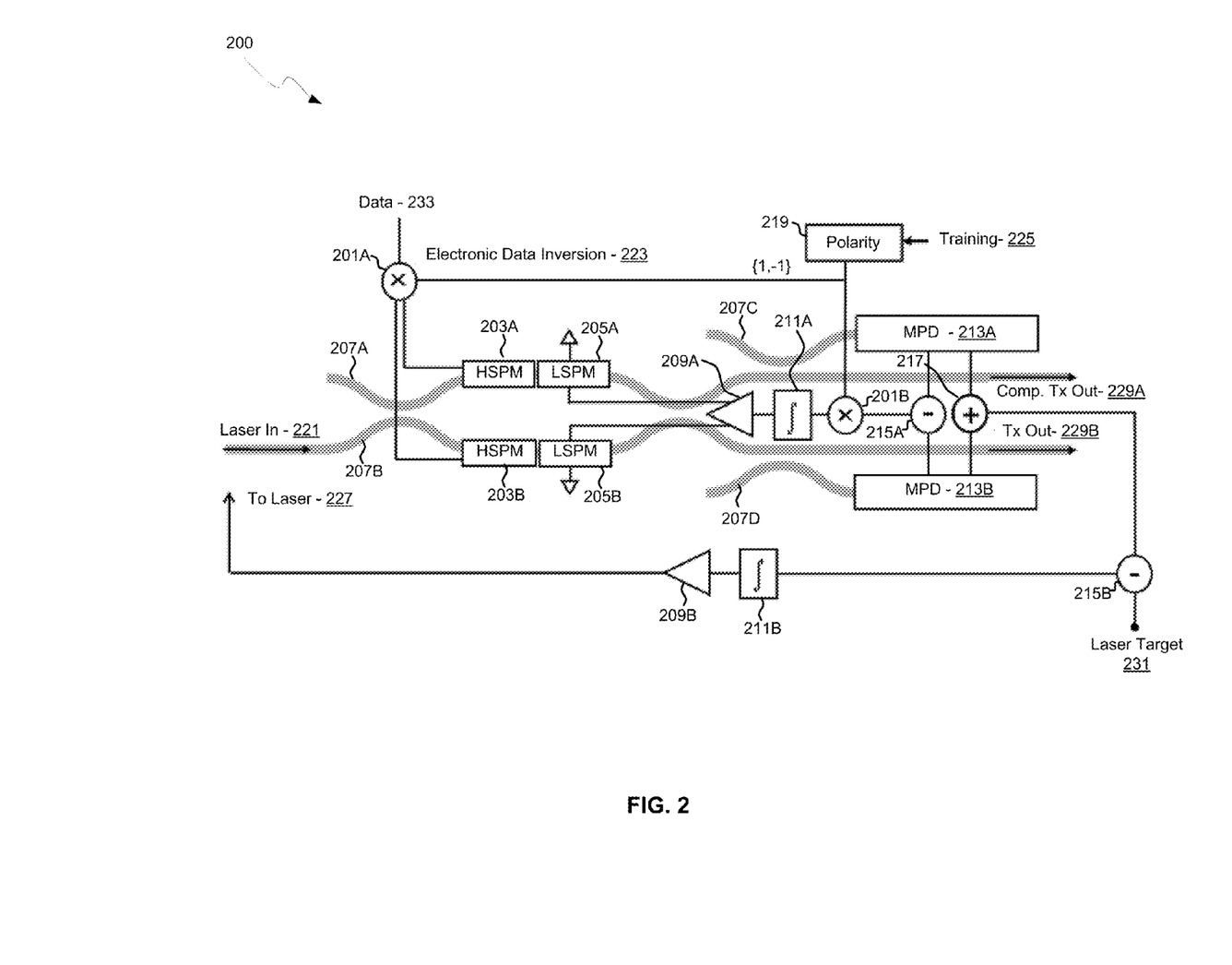
FIG. 2 is a block diagram of an exemplary integrated MZI and laser controls system, in accordance with an embodiment of the invention.

FIG. 2 is a block diagram of an exemplary integrated MZI and laser controls system, in accordance with an embodiment of the invention. Referring to FIG. 2, there is shown an integrated MZI and laser control system 200 comprising multipliers 201A and 201B, high-speed phase modulators (HSPMs) 203A and 203B, low-speed phase modulators (LSPMs) 205A and 205B, optical waveguides 207A-207D, gain blocks 209A and 209B, integrators 211A and 211B, monitor photodiodes (MPDs) 213A and 213B, subtractors 215A and 215B, an adder 217, and a polarity block 219. There is also shown a Laser In 221, an electronic data inversion signal 223, a training signal 225, a laser control signal 227, Tx out signal 229B, a complementary Tx out signal 229A, a laser target signal 231, and a data signal 233.

The multipliers 201A comprise circuitry that may be operable to multiply received signals resulting in an output signal that is a product of the input signals. For example the multiplier 201A may multiply the data signal 233 by a polarity signal, thereby generating either the original data signal 233 or an inverted version of the data signal 233 to be communicated the HSPMs 203A and 203B.

The HSPMs 203A and 203B and the LSPMs 205A and 205B comprise electrical, optical, and optoelectronic components that may be operable to modulate the phase of received optical signals. The HSPMs 203A and 203B may be utilized to modulate the input CW optical signal, the Laser In 221, with the data signal 233, and the LSPMs 205A and 205B may be operable to provide a slowly varying bias point of the MZI.

The optical waveguides 207A-207D may comprise optical materials of different dielectric constant, thereby confining an optical mode for communicating throughout a chip, such as the chip 130. By integrating the 207C and 207D in close proximity to the 207A and 207B, taps may thereby be configured to monitor the optical signals communicated by the optical waveguides 209A and 209B.

The integrators 211A/211B and the gain blocks 209A/209B may comprise circuitry for filtering received signals, thereby generating the filtered control signals, the laser control signal 227 and the control signals for the LSPMs 205A and 205B.

The MPDs 213A and 213B may comprise semiconductor photodiodes integrated in the same chip as the other components of the integrated MZI and laser control system 200. The MPDs 213A and 213B may comprise germanium (Ge) photodiodes, for example, and may be operable to receive optical signals from the optical waveguides 207C and 207D and generate electrical output signals, proportional to the optical signals, to the subtractor 215A and the adder 217.

The subtractors 215A and 215B comprises circuitry for generating an output signal that is the difference between the input signals. In this manner, the subtractor 215A may be operable to generate a difference signal from the output signals of the MPDs 213A and 213B, thereby generating an error signal for the calibration of the integrated MZI and laser control system 200. Similarly, the subtractor 215B may subtract a signal generated by the adder 217 from the laser target 231 generate a laser control signal to be filtered by the integrator 211B and the gain block 209B.

The adder 271 comprises circuitry that is operable to sum signals received from the MPDs 213A and 213B, thereby measuring the average power communicated to the HSPMs 203A and 203B and the LSPMs 205A and 205B from the laser In signal 221.

The polarity block 219 comprises circuitry that may be operable to generate +1 or −1 polarity signal for inverting the data signal 233 in the multiplier 201A. In this manner, calibration requirements may be relaxed for the integrated MZI and laser control system 200.

Since the passive biasing of an MZI varies over device population and over environmental factors, it is not a-priori known by the control system, but needs to be measured. The passive phase may be measured by monitoring the light intensity at the output port of the MZI. In a high-speed communication system, the high-speed phase modulation corresponding to the data stream can be made transparent to the control system by using an MPD subsystem comprising an MPD and front-end electronics that are more bandwidth limited than the lowest frequency components of the data stream, or by integrating/filtering/post-processing the MPD data at later stages. As a consequence, the average of $\eta[1+\sin(\phi_{Tune}+\phi_{Mod}+\phi_{Passive}+\phi_0)]$ may be monitored, i.e., $\eta[1+\sin(\phi_{Tune}+\phi_{Passive}+\phi_0)\cos(\phi_{Mod\_Max})]$. The power at the tapped output port should then be maintained at $\eta$ in order to satisfy $\phi_{Tune}+\phi_{Passive}+\phi_0=0$. In these formulas, $\eta$ is a proportionality constant depending on the power at the input of the MZI, and thus on laser power, on the losses within the MZI, such as from waveguide losses and absorption by implants and free carriers in phase modulators, and on the tap ratio.

Since each of these are subject to variability, $\eta$ is not typically known, but may be determined by a calibration procedure.

Variability may be particularly severe in an integrated system, where components are not picked individually to correspond to tight specifications, or to compensate for each other, but where joint manufacturing of all the components results in a large overall variability. The calibration scheme that determines $\eta$ can occur at chip start-up, during manufacturing, or on a periodic basis, for example. Typically, the output port tap may be compared to other tap value(s), for example at the input of the MZI (the input tap as opposed the output tap, located at the output of the MZI), since optical power levels may also dynamically change due to laser power fluctuations. For example, the input tap might be used to track—and normalize out—fluctuations of laser power, while a calibration procedure might still be required to normalize out losses inside the MZI that occur between the input tap and the output tap, as well as variations in the optical taps themselves.

An exemplary configuration of tap placement may result in a situation where variability in input optical power, MZI losses, and matched variability of the taps and read-out circuitry (i.e. where both tap ratios co-vary over process) may be automatically factored out without requiring additional calibration. This tap placement applies to an MZI where the recombination of the two optical paths is done via a directional coupler, a multi-mode interferometer, or other coupling devices with a least two input ports and at least two output ports. In that case, there are actually two output ports to the MZI, one carrying an optical signal modulated according to the electrical data flow, the Tx Out 229B, the other modulated according to the inverted data flow, where 0s and 1s are flipped, comprising the complementary Tx out 213A. In this case, taps may be placed at both ports.

In an integrated system, both ports may be available for monitoring, independently on whether the complementary output port is actually routed out of the chip or not. In the case of taps of equal tap ratio, the condition for the 3 dB point is to equalize the average power monitored at the two taps, where average refers to the average taken over data modulation. This condition may be monitored by directly comparing the monitored power levels at the two ports by determining the difference between the two photocurrents generated by the MPDs 213A and 213B, as the error signal generated by the subtractor 215A without additional calibration, provided the mismatch between the two taps, MPDs 213A and 213B and readout circuitry is kept within tight bounds. An additional benefit is that uncalibrated mismatch between the two output taps affects the control scheme at only half the rate as mismatch between an input tap and an output tap, so that this scheme is also more robust relative to mismatched variability of the optical taps and read-out circuits.

In the absence of calibration, the performance of this control scheme may be a direct function of tap mismatch, MPD mismatch, or mismatch in the MPD read-out circuits. Absolute variations of taps, MPD responsivity and read-out circuitry do not impact the MZI control scheme. Thus, it is advantageous to keep mismatch within tight bounds. Taps, MPDs and readout circuitry may be tightly matched since the architecture may be fully differential and may be compatible with a matched layout of the taps, MPDs and read-out circuitry.

However, a control scheme comparing the input and output taps may not be compatible with matched, differential layout because the input tap and output tap may be separated by much larger distances on the chip. They monitor power levels of different amplitudes, due to losses within the MZI and due to the fact that the 3 dB point only corresponds to ½ of the input power. Thus the tap ratios may require adjustment or the signals may be adjusted in the electronic domain.

The same taps used for MZI control may also be used for laser control. One of the two taps may be sufficient to monitor laser power levels, provided the MZI may already be controlled, since the optical power may then be equally split between the two output ports. A possible start-up sequence in this case may be to first operate the laser at a fixed bias, which may be temperature dependent or determined by other factors, while stabilizing MZI control. In a second step, the laser operation may then be switched from fixed bias to controlled power, with the laser control scheme then relying on the fact that the MZI is already controlled.

A laser control scheme that is independent of MZI control, but which does not require the addition of extra taps—and the corresponding link budget penalties—may be more desirable. This may be achieved by summing up the measured power levels at the two taps, the result being independent of the state of the MZI since the power is split between the two outputs, but remaining proportional to the laser power. Additionally, a single tap may be placed in the main optical path, connecting the laser to the receiver, so that a link budget benefit may also be achieved.

In an embodiment of the invention, the LSPMs 203A and 203B and the HSPMs 205A and 205B may be driven in a differential manner. This may reduce hardware requirements, and by reducing power consumption and optical absorption, the LSPMs 203A and 203B may be driven independently with only one LSPM actuated at a given time, so as to avoid the two LSPMs competing for power. Also the inversion for the MZI control loop gain may be applied at the level of the error function entering a state machine/analog control circuitry/mixed signal control circuitry, depending on implementation, but could also be applied elsewhere, such as the output or input of the gain stage 209A. Furthermore the integrator 211A may also correspond to a PID control scheme, or to other control schemes.

In an exemplary embodiment of the invention, the integrator 211A may be roughly equivalent to an integrator, without being exactly an integrator, since the error function comprising the difference of the MPD signals generated by the subtractor 217 may be communicated to a comparator that outputs a 1 or a 0. In this case, the integrator may not sum the continuous error function, but the 1-bit digitized version. The constant magnitude update may step irrespective of the amplitude of the error function rather then an update rate that is proportional to the magnitude of the continuous error function.

A control scheme with update steps proportional to the magnitude of the error function may be implemented by applying a binary search to the data acquisition system so as to measure the magnitude of the error signal, as opposed to a thresholding operation that only records the sign. Such a scheme may converge faster then a constant update step scheme, since large corrections may be made for large initial errors. Whether the enhanced timing performance of the control scheme overcomes the timing lost due to time overhead of the binary search may primarily be a function of the bandwidth of the drivers and optoelectronic components. For example, if the laser voltage is regulated by a relatively slow regulator, such as a switching voltage regulator, the timing overhead of the binary search will not impact the system, but the improvements in control scheme will largely accelerate its performance.

Figure 3:
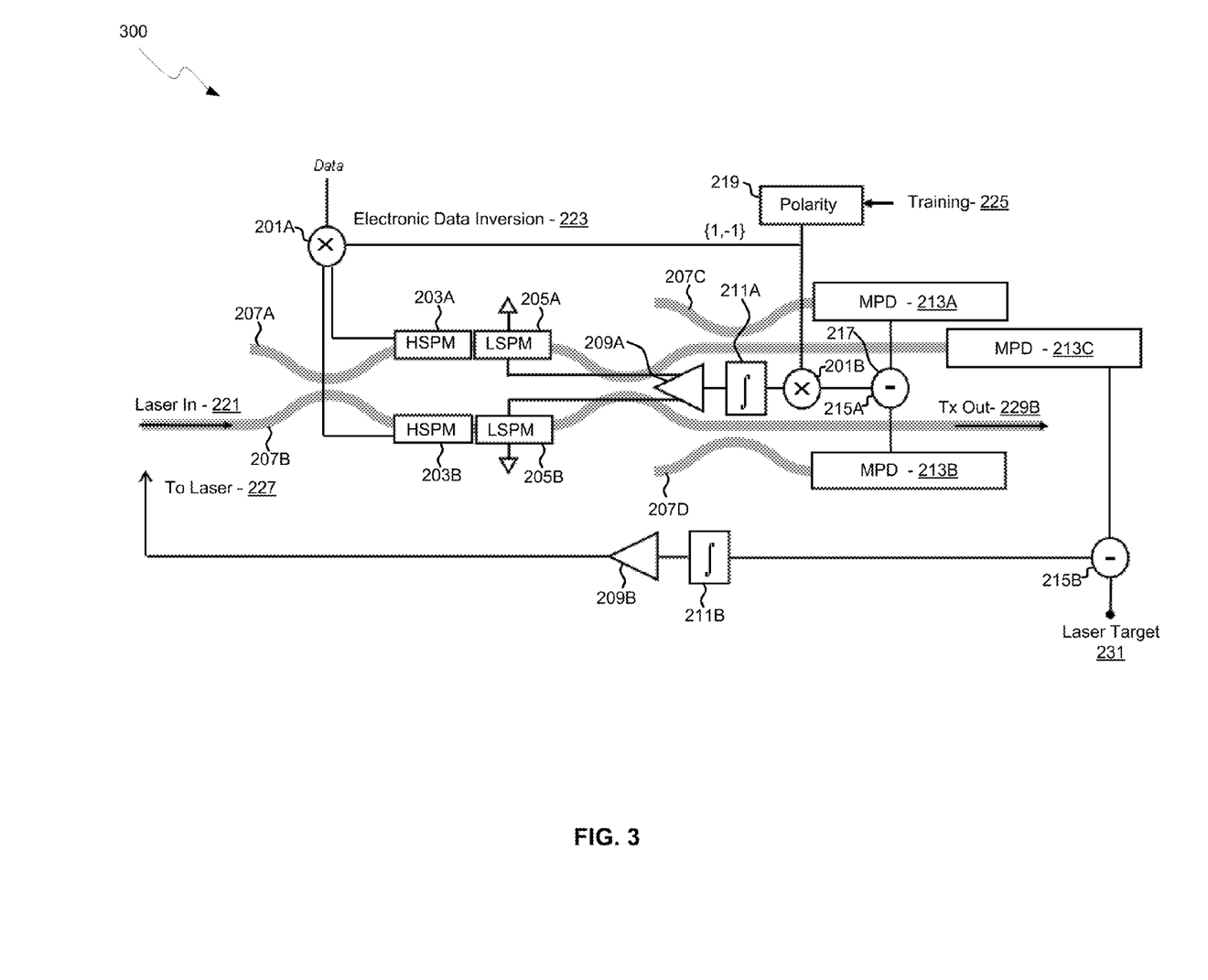
FIG. 3 is a schematic of an exemplary integrated control scheme with additional photodetector, in accordance with an embodiment of the invention.

FIG. 3 is a schematic of an exemplary integrated control scheme with additional photodetector, in accordance with an embodiment of the invention. Referring to FIG. 3, there is shown an integrated MZI and laser control system 300 comprising the multipliers 201A and 201B, the HSPMs 203A and 203B, the LSPMs 205A and 205B, the optical waveguides 207A-207D, the gain blocks 209A and 209B, integrators 211A and 211B, the MPDs 213A and 213B, an additional MPD 229C, the subtractors 215A and 215B, an adder 217, and a polarity block 219. There is also shown the Laser In 221, the electronic data inversion signal 223, the training signal 225, the laser control signal 227, the Tx out signal 229B, a laser target signal 231, and a data signal 233.

The additional MPD 229C may be used to monitor the remaining, non-tapped, part of the signal, by coupling to the transmitted port of the tap, as opposed to a dropped port. This additional signal may be used for laser control, providing the additional benefit of a control signal for laser control that may be only very weakly subject to variations of tap ratios. If the laser is controlled based on a tapped signal, X % in tap ratio will result into X % variation in the signal provided to laser control, while in the latter case, X % variation in the tap ratio will result in $100*[1-\text{Nominal\_Tap}*(1\pm X/100)]/[1-\text{Nominal\_Tap}]$ variation in the signal provided to the laser control. Since the nominal tap ratio may typically be very small, the latter variation may be much smaller then the former one. Since the MZI control may already be immune to matched variations of tap ratios, which may result in a control scheme completely immune to such variations, for both the MZI and the laser control.

In instances where a Y-junction is used as the output coupler of the MZI, there is no complementary output port to compare the main output port to, since a Y-junction is not a 2 by 2 device, but only a 1 by 2 device. In this case, tap placement may require an input tap/output tap scheme. However, in an integrated system, the tap placement may still be improved to remove some of the device variability. The input tap may not be required at the input of the MZI, but its functional equivalent(s) may be placed inside the MZI as long as the equivalents provide a signal that is proportional to laser power but independent of the MZI bias point comprising the phase tuning and passive biasing. This may be achieved by tapping one or both of the branches of the MZI. By placing the taps on the branches and as close as possible to the end of the branches, close to the output coupler, losses inside the MZI may be normalized out since both the output and the input tap(s) are subject to these losses.

In order to avoid incurring variability of the splitting ratio of the input splitter of the MZI, both branches of the MZI may be tapped and the resulting signals summed or averaged. The summation may be done in the electrical domain, or in the optical domain by sending both optical signals to the same MPD. In the case of a waveguide based MPD, this may be achieved by sending one signal to each end of the MPD, or by using a wider MPD that can connect to two waveguides. This comprises a tap scheme that minimizes the penalty associated with not doing a calibration, while at the same time remaining compatible with using other couplers at the output of the MZI—such as a Y-junction—since only a single tapped signal may be required at the output of the MZI.

To minimize the bill of materials or the utilized die area, it may be beneficial to share the hardware between the laser and MZI control schemes. In particular, in an integrated control scheme, the signals generated by the MPDs may be sent to comparator in the control sections 112A-112D in a reconfigurable manner. This configuration may then be cyclically switched, so as to interleave data acquisition for the laser and for the MZI control scheme. For laser control, an additional signal proportional to the targeted laser power may be required. This signal can be partially or fully programmable, for example by using a digital to analog converter (DAC) to allow for adjusting the targeted laser power, compensating for process variation in tap ratios, optical losses, MPD responsivity and read-out circuitry.

The sign of $S_{MPD1}-S_{MPD2}$ for MZI control may be monitored, where $S_{MPD1}$ comprises the signal generated by MPD 213A and $S_{MPD2}$ comprises the signal generated by MPD 213B. For laser control, the sign of either $S_{MPD1}-S_{LASER\_REF}$, $S_{MPD2}-S_{LASER\_REF}$, $S_{MPD1}+S_{MPD2}-S_{LASER\_REF}$, or $S_{MPD3}-S_{LASER\_REF}$ may be measured depending on whether one, the other, both of the MPDs, or a dedicated MPD are used.

This implementation of the control system has the benefit that independent analog to digital converters (ADCs) are not required for the MPDs 213-213C. This may reduce the required hardware, and enable very fast data acquisition even with relatively simple electronics, since a simple thresholding operation may be utilized for either control system, as opposed to a complete binary search, for example, that would require N thresholding cycles per data point, where N is the number of bits. If required, these binary searches may be utilized with the same hardware by varying the settings of $S_{LASER\_REF}$.

Monitoring of the tap power levels may be desirable for advanced control systems, such as when update steps for laser and/or MZI are required to be proportional to the continuous error function, for faster convergence. Or it may be desirable in special circumstances such as if the control loops are momentarily opened and the MZI and laser remotely controlled during test or characterization, power level readings internal to the chip/system may be required for data collection purposes. The binary search required to obtain these readings may be operated remotely. For example, if the integrating comparator and the signal routing configuration are controlled by a state machine, the state machine may have a built-in overwrite capability that allows remote control of said circuits. Or the binary search capability may be built-in directly into the autonomous system. In the latter case, the state machine may be put in a binary search/ADC mode when the control loops are opened, or the binary search may be completed during regular control.

If it is desirable to maintain the fast timing achieved by controlling the laser and MZI based on single thresholding operations, the thresholding operations for the binary search may be, if needed sparsely, interleaved with the thresholding operations providing data for control. The state machine may then sequentially measure for the binary searches, and for laser and MZI control.

In a preferred embodiment, the comparators in the control sections 112A-112D comprise a current comparator, for example an integrating current comparator, that outputs a 1 or a 0 depending on the sign of the current at the summing node at the comparator input. The reference for the laser power level may be provided by a current DAC that is connected to the input node of the current comparator. The mapping between the MPDs 213A-213C and the comparator may configured by selectively enabling or shutting down current mirrors.

When the laser generating the Laser In 221 signal is shared between multiple channels, it can be controlled by the control system of one of the multiple channels, or it can be controlled based on data collected from several channels. In the latter case, it may be controlled so that the strongest channel verifies a target power at its tap(s), or so that the weakest channel verifies a target power at its tap(s), or intermediate situations. For example, data may be aggregated by taking the max, the min or a weighted average. The N bits of the N channel specific laser control feedback signals may be summed, and a laser control threshold set to 0, N, or some other number between 0 and N (e.g. N/2).

As previously described, the phase tuning for optimum MZI operation corresponds to $\phi_{Tune}+\phi_{Passive}+\phi_0=0$ modulo $2\pi$ (Equation 1) or $\phi_{Tune}+\phi_{Passive}+\phi_0=\pi$ modulo $2\pi$ (Equation 2) depending on the data polarity that may be targeted. In each of these cases, there may be several solutions to the equation depending on the available range for $\phi_{Tune}$ (the tuning range). As indicated, these solutions are spaced by $2\pi$. In other words, once tuning starts, the closest solution to the equation will be less then $\pi$ phase away, and the control scheme automatically converges to the closest solution by means of closed loop operation. Thus, in order to ensure that a solution will be found, the tuning range should be at least $\pm\pi$ from its initial phase, hereafter referred to as the neutral tuning point.

Since closed loop operation may be maintained after initial start-up of the system, in order to compensate for changes in environment, self-heating of the chip, or other fluctuations, there may be an additional phase range available to accommodate drift after start-up, the required magnitude of which may be a function of the sensitivity of the MZI and the bounds on environmental conditions. The required tuning range then becomes $\pm(\pi+\delta)$, where $\delta$ is the phase range allocated for drift after start-up.

A tradeoff may exist for increased tuning magnitude, either in terms of power consumption, particularly the case for TPMs, the required voltage headroom for drivers (and size of driver layout), or link budget penalties. In a forward biased PINPM for example, optical losses induced are mostly due to absorption by free carriers, which may be directly proportional to the applied phase, also induced by free carriers. Thus, there may be a strong incentive to reduce the required phase range in order to improve system performance.

Between Equations (1) and (2) above, one of the two will have a bias point within $+/-\pi/2$ of the initial passive bias point. However, this may result in inversion of the optical data polarity for one of the two formulas. In that case, the data polarity may be compensated by inverting it elsewhere in the electrical domain, for example by placing a programmable data inverter in the electrical data path prior to the MZI, where the programmability decides whether the inverter is inverting the data or not. In order to maintain stable closed loop operation of the MZI control scheme around the bias point with the appropriate data polarity, the loop gain may be inverted when the data polarity is switched in the electrical domain. For a given sign of loop gain, solutions to equation (1) will be stable points and solution to equation (2) will be meta-stable points, so that the control scheme may converge on solutions to equation (1), and vice-versa for the opposite loop gain.

In order to implement this scheme in a preferred embodiment, an initial training phase may select the loop gain and the electronic data polarity before the closed loop control phase. In the training phase, a search algorithm may be applied to find the closest bias point to the initial neutral biasing, or the bias point with the lowest power consumption or link budget penalty, irrespective to whether it corresponds to positive or negative data modulation by the MZI. For example, the tuning phase may be scanned in one direction from the neutral point until $S_{MPD1}-S_{MPD2}$ flips sign, and then scanned in the opposite direction from the neutral point until $S_{MPD1}-S_{MPD2}$ flips sign. The closest tuning phase where $S_{MPD1}-S_{MPD2}$ flips may then be selected as the target bias point.

The selected electronic data polarity and loop gain may be updated as a function of the sign of $S_{MPD1}-S_{MPD2}$ at the neutral point, and of whether the selected point is for a positive or negative tuning phase relative to the neutral point. If needed, algorithms may be further improved, from a timing perspective, by aborting scans in one direction if the scan went further than $\pi/2$, in which case the closest bias point may be known to be on the other side of the neutral point, or by using more sophisticated search algorithms such as a binary search. When this scheme is implemented, the $\pm(\pi+\delta)$ phase range requirement may be reduced to a $\pm(\pi/2+\delta)$ phase range requirement.

Figure 4:
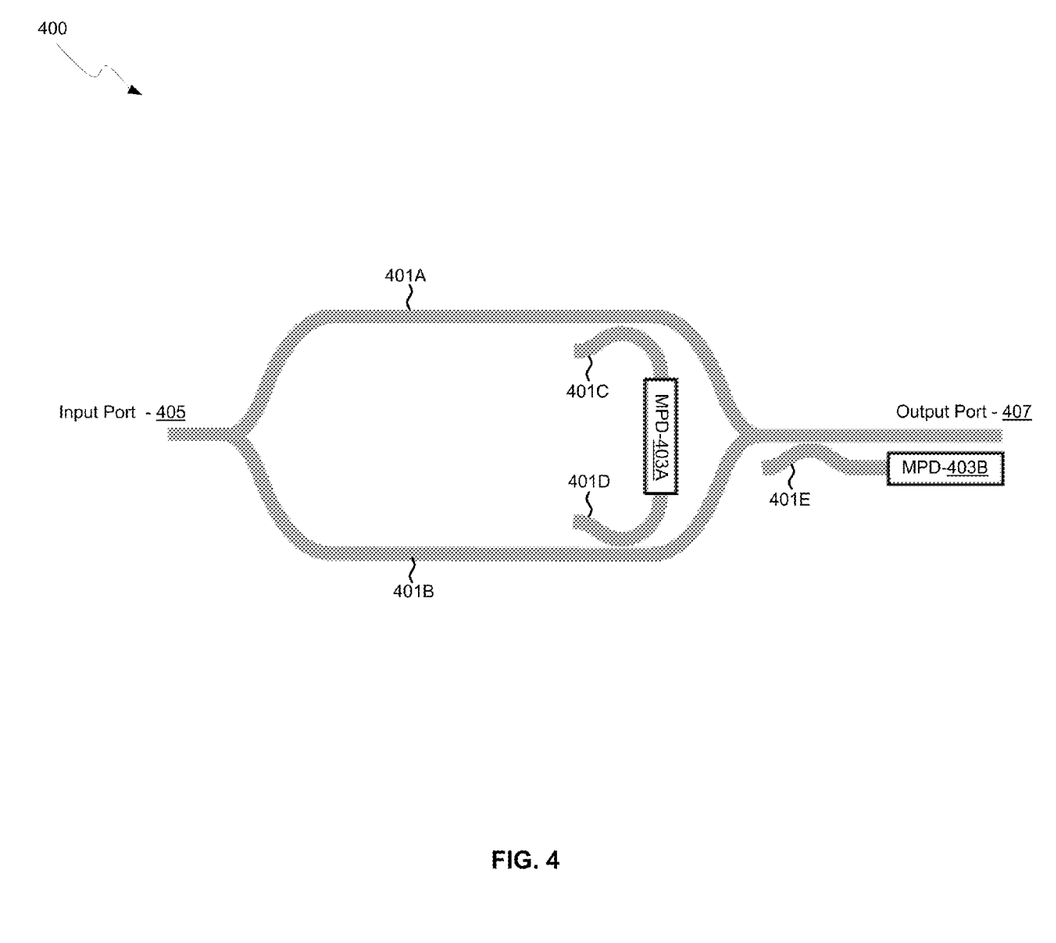
FIG. 4 is a schematic of an exemplary tap and monitor photodiode placement scheme, in accordance with an embodiment of the invention.

FIG. 4 is a schematic of an exemplary tap and monitor photodiode placement scheme, in accordance with an embodiment of the invention. Referring to FIG. 4, there is shown optical waveguides 401A-401E, MPDs 403A and 403B, an input port 405, and an output port 407. The optical waveguides 401A-401E an the MPDs 403A and 403B may be substantially similar to the optical waveguides 207A-207D and the MPDs 213 AND 213B described with respect to FIG. 2.

In operation, an optical signal may be communicated to the input port 405 and split into two signals generated by the Y-junction configured by the optical waveguides 401A and 401B. The signal intensities may be measured by tapping off of the optical waveguides 401A and 401B utilizing the optical waveguides 401C and 401D and coupling the signals to the MPD 403A.

Following the rejoining of the optical waveguides 401A and 401B, the intensity of the combined signal may be measured by tapping off the signal via the optical waveguide 401E and coupling to the MPD 403B. By integrating the MPD 403A near the end of the MZI branches, the losses in the MZI may be normalized out.

Figure 5:
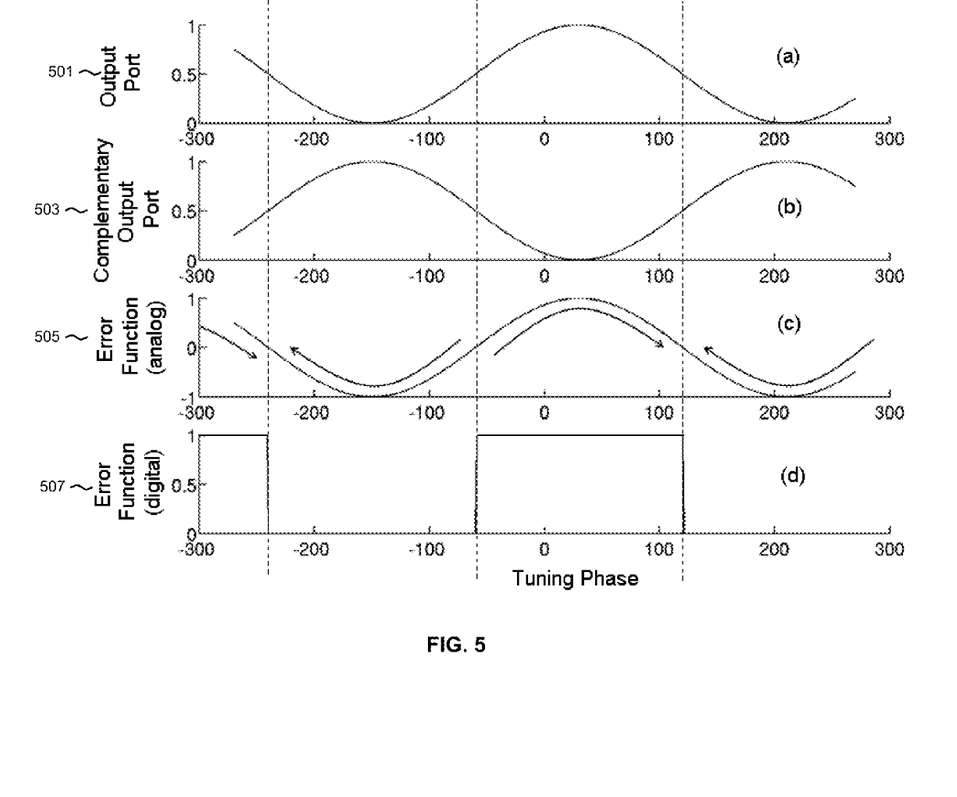
FIG. 5 is a plot of signals at output ports of a Mach-Zehnder interferometer as a function of tuning phase, in accordance with an embodiment of the invention.

FIG. 5 is a plot of signals at output ports of a Mach-Zehnder interferometer as a function of tuning phase, in accordance with an embodiment of the invention. Referring to FIG. 5, there is shown output port signal 501, complementary output port signal 503, analog error function 505, and digital error function 507.

The output port signal 501 and the complementary output signal 503 represent output power at the output ports, such as Tx out 229B and complementary Tx out 229A, for example. The analog error function 505 comprises the difference between the output port signal 501 and the complementary output signal 503, and the digital error function 507 comprises the error function if communicated to a comparator that performs a thresholding operation.

The analog error function 505 illustrates that there are two stable points and one meta-stable point. In this example, the meta-stable point is the closest to the neutral bias point (zero). By inverting the loop gain, this bias point can be made a stable bias point. The data polarity of the electric data stream then may be inverted to compensate for the inversion of data polarity in the MZI. It can also be seen that during closed loop operation the control scheme converges to the closest bias point with the programmed polarity.

In an embodiment of the invention, a method and system are disclosed for integrated control system for a laser and Mach-Zehnder interferometer. Aspects of the invention may comprise configuring a bias point for low-speed control of an optical modulator 105A-105D utilizing control circuitry integrated on the same CMOS die 137 as the optical modulator 105A-105D. Optical signals of the optical modulator 105A-105D may be differentially monitored. A laser source for the optical modulator 105A-105D may be controlled utilizing one or more monitor photodiodes 113A-113H/213-213C via optical taps 103D-103K on output ports of the optical modulator 105A-105D. A laser source 101/147 for the optical modulator 105A-105D may be controlled utilizing a monitor photodiode 113A-113H/213-213C on an output port of the optical modulator 105A-105D, 203A, 203B, 205A, 205B. The optical modulator 105A-105D, 203A, 203B, 205A, 205B may comprise a Mach-Zehnder interferometer. An error signal may be generated by subtracting monitor photodiode signals from optical taps on two output ports of the optical modulator 105A-105D, 203A, 203B, 205A, 205B. The bias point of the optical modulator 105A-105D, 203A, 203B, 205A, 205B may be adjusted by minimizing the error signal. Calibration range of the bias point may be reduced utilizing electronic data inversion 223. An output of the optical modulator 105A-105D, 203A, 203B, 205A, 205B may comprise a Y-junction and a single monitor photodiode may measure both branches of the optical modulator.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
   in an optical modulator integrated on a single CMOS chip comprising control circuitry for said optical modulator, configuring a bias point for low-speed control of said optical modulator utilizing said control circuitry.

2. The method according to claim 1, comprising differentially monitoring optical signals of said optical modulator.

3. The method according to claim 1, comprising controlling a laser source for said optical modulator utilizing one or more monitor photodiodes via optical taps on output ports of said optical modulator.

4. The method according to claim 1, comprising controlling a laser source for said optical modulator utilizing a monitor photodiode on an output port of said optical modulator.

5. The method according to claim 1, wherein said optical modulator comprises a Mach-Zehnder interferometer.

6. The method according to claim 1, comprising generating an error signal by subtracting monitor photodiode signals from optical taps on two output ports of said optical modulator.

7. The method according to claim 6, comprising adjusting said bias point of said optical modulator utilizing said error signal.

8. The method according to claim 7, comprising minimizing said error signal for said adjusting of said bias point.

9. The method according to claim 1, comprising reducing calibration range of said bias point utilizing electronic data inversion.

10. The method according to claim 1, wherein an output of said optical modulator comprises a Y-junction and a single monitor photodiode measures both branches of said optical modulator.

11. A system for processing signals, the system comprising:
    a single CMOS chip comprising control circuitry for an optical modulator integrated on said CMOS chip, said control circuitry comprising one or more optical components and one or more electrical components, at least one of said one or more optical components and said one or more electrical components being operable to configure a bias point for low-speed control of said optical modulator.

12. The system according to claim 11, wherein said at least one of said one or more optical and electrical components are operable to differentially monitor optical signals of said optical modulator.

13. The system according to claim 11, wherein said at least one of said one or more optical and electrical components are operable to control a laser source for said optical modulator utilizing one or more monitor photodiodes via optical taps on output ports of said optical modulator.

14. The system according to claim 11, wherein said at least one of said one or more optical and electrical components are operable to control a laser source for said optical modulator utilizing a monitor photodiode on an output port of said optical modulator.

15. The system according to claim 11, wherein said optical modulator comprises a Mach-Zehnder interferometer.

16. The system according to claim 11, wherein said at least one of said one or more optical and electrical components are operable to generate an error signal by subtracting monitor photodiode signals from optical taps on two output ports of said optical modulator.

17. The system according to claim 16, wherein said at least one of said one or more optical and electrical components are operable to adjust said bias point of said optical modulator utilizing said error signal.

18. The system according to claim 17, wherein said at least one of said one or more optical and electrical components are operable to minimize said error signal for said adjusting of said bias point.

19. The system according to claim 11, wherein said at least one of said one or more optical and electrical components are operable to reduce calibration range of said bias point utilizing electronic data inversion.

20. The system according to claim 11, wherein an output of said optical modulator comprises a Y-junction and a single monitor photodiode measures both branches of said optical modulator.

* * * * *